RE 25714
May 1, 1962    C. F. KAEGEBEIN    3,032,010
MEANS FOR CONTROLLING THE LAYING HABIT OF HENS
Filed Sept. 5, 1961
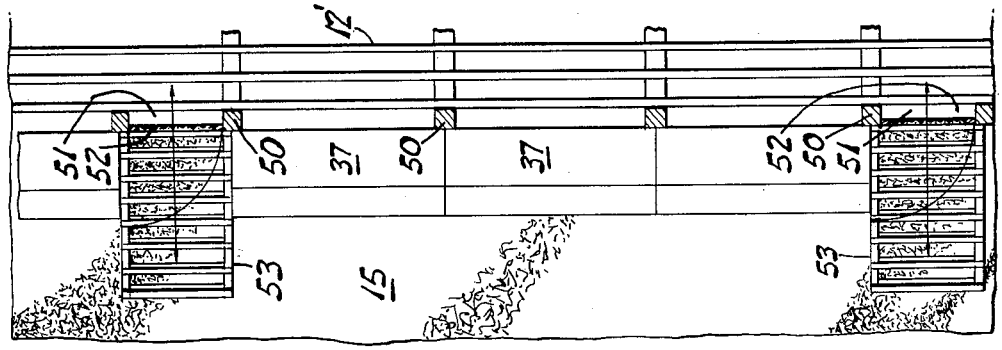
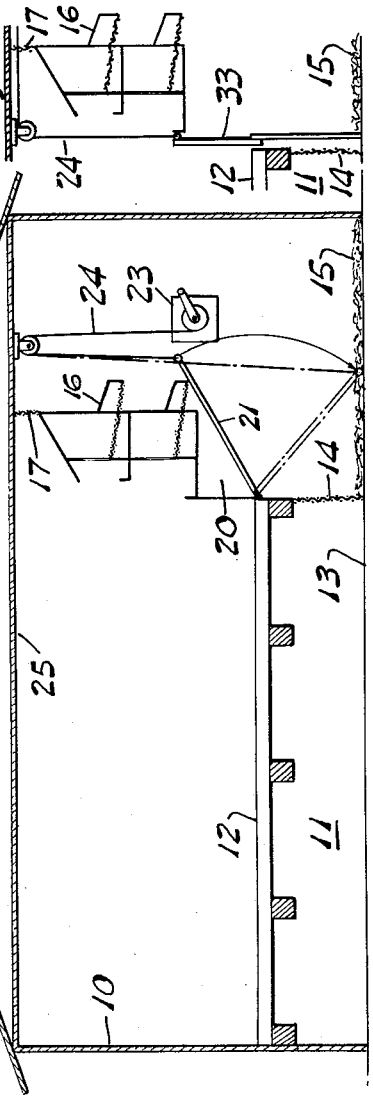
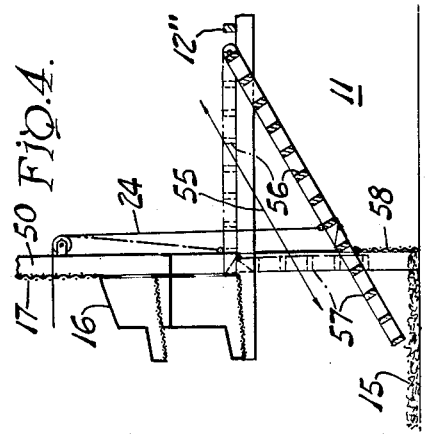
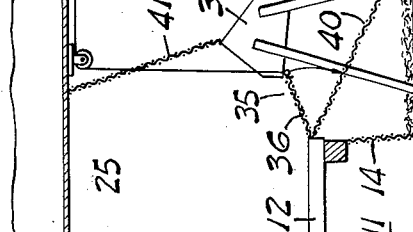
INVENTOR.
*Carl F. Kaegebein,*
BY
*Christel + Bean*
ATTORNEYS,

United States Patent Office 3,032,010
Patented May 1, 1962

3,032,010
MEANS FOR CONTROLLING THE LAYING
HABIT OF HENS
Carl F. Kaegebein, Long Road, Grand Island, N.Y.
Filed Sept. 5, 1961, Ser. No. 135,865
10 Claims. (Cl. 119—21)

My invention relates in general to poultry laying nests, and in particular to means for controlling the laying habits of hens. This application is a continuation-in-part of my pending application Serial No. 847,006, filed October 16, 1959.

It is well known to those skilled in the art that when the rollaway type of nest is used with a sloping wire bottom for the self gathering of eggs, there is a tendency for the flocks to resist the wire bottom nests and thereby lay a greater than normal percentage of eggs on the litter covered hen house floor. There is, however, some value in the use of litter in which the hens can dust themselves and especially is this true in the control of cannibalism and picking. It is, therefore, desirable to have at least a portion of the floor area of the hen house covered with litter in place of having the entire floor area covered by slats or wire screen. When this arrangement is used in combination with the roll-out type of nest, some means must be provided to keep the birds out of the litter area when it is necessary to control their nesting habits.

A principal object of my invention is to provide means whereby the hens will be allowed to occupy the litter covered area only at times when the caretaker sees fit.

A further object is to provide means for restricting the hens to the feeding and laying areas during the laying period of the day, allowing access to the litter covered area only after the heavy rate of lay is over.

The above objects and advantages have been accomplished by the device shown in the accompanying drawing, of which:

FIG. 1 is an end sectional elevation of one embodiment of my device;

FIG. 1A is a fragmentary view, illustrating another movable panel arrangement;

FIG. 2 is a fragmentary elevation of a modified form of the invention;

FIG. 3 is a fragmentary view, partly in plan and partly in section, of still another form of my invention; and FIG. 4 is a fragmentary view, like FIGS. 1 and 2, of yet another form of my invention.

Referring particularly to the form of invention shown in FIG. 1, my device comprises a hen house 10 having a pit 11 covered by a slatted floor 12. This floor extends from one side wall toward the other side wall for a suitable distance and may be equal to two-thirds of the total width of the house. The space between the far edge of the floor and the ground level 13 is closed, preferably by means of a screen wall 14. The ground level 13 beyond the end of the slatted floor is covered with litter and provides a litter covered area 15. Thus, the hen house floor has a slatted floor portion and a litter floor portion.

Adjacent the far end of the slatted floor and elevated above it are the laying nests 16 of the hen house which are closed at their rear sides and which may be supported by the ceiling 25 of the house, a screen 17 being provided to close the space between the ceiling and the top of the nest. A space 20 is therefore provided for egress of the hens when going from the floor 12 to the litter covered area 15, and vice versa. A trap panel 21 is provided to open and close the space and it is preferably hinged to the end of the slatted floor, as illustrated, or to the bottom of the nests 16. Alternately, if desired the panel may be moved by suitable means back and forth over the opening by a sliding motion, as shown at 33 in FIG. 1A. A windlass 23 is preferably used to actuate the panel. The windlass controls a cable 24 which passes over an idler carried by the ceiling 25 and which is attached at its free end to the panel.

In the form of invention shown in FIG. 2, a nest 37 of a different type is shown, one which is supported upon the floor of the litter covered area 15. This nest is disposed in spaced relation to the adjacent edge of the slatted floor 12, thereby providing an access opening 35 between the nest and the edge of the floor. A trap panel 36 is preferably hinged to the adjacent edge of the slatted floor, or to the nest, and serves to open and close the opening 35 preferably by means of the cable 24 controlled by the windlass 23. A partition 41 preferably in the form of a wire screen serves to close the space between the nest and the ceiling 25. If desired a screen runway 40 may be provided which extends upwardly from the litter covered area 15 to the edge of the slatted floor 12.

In the form of the invention shown in FIG. 3 there is again provided a series of nests, which can be of any type but are here shown as being of the type depicted at 37 in FIG. 2, extending along the adjacent ends of the slatted floor 12' and litter area 15. Nests 37 are separated into spaced groups, and vertical studding 50 is provided at the juncture between adjacent nests and at the ends of each group of nests. The spaces 51 thus provided between groups of nests comprises access openings between floor 12' and litter area 15. Panels 52 are mounted on certain of the vertical studs 50 to swing about a vertical hinge axis and thereby open and close the access openings 51. Door panels 52, when closed, extend between the adjacent ends of the spaced groups of nests, and between the nests and the adjacent end of floor 12', and thereby control the passage of hens to, and from, litter area 15. Runways 53, extending upwardly from litter area 15 to floor 12 may be provided.

In the embodiment of FIG. 4, a series of nests 16 extend along the adjacent ends of slatted floor 12" and litter area 15. The lowermost nests are level with floor 12", which also can be true of the embodiment shown in FIG. 3. In this embodiment, floor 12" is provided with a series of openings 55 at spaced points along the series of nests 16. Drop panels 56, comprsing parts of floor 12", are hinged at one end to fixed portions of floor 12", and have extensions 57 hinged to the other ends thereof. When panels 56 are in closed position, shown in phantom in FIG. 4, extensions 57 hang down and cooperate with a fixed partition 58, preferably of wire screen, to close off pit 11 from litter area 15. When panels 56 are lowered, to the position shown in solid lines in FIG. 4, extensions 57 rest on partitions 58 and comprise, with panels 56, runways extending upwardly from litter area 15 to floor 12". Thus, access openings 55 can be selectively opened and closed by panels 56, to control the passage of hens to litter area 15.

Thus, it is seen that, in each of the foregoing embodiments, the nests 16, 37 are positioned at an elevation above the litter area 15 adjacent the juncture between the slatted floor 12, 12' or 12" and the litter area 15, and extend along the adjacent ends thereof. The access openings 20, 35, 51 and 55 can be positioned below the nest, in front of the nests, or beside the nests, with the panel doors in each instance extending between the nests and one of the adjacent floor ends. With this arrangement it appears that a traffic pattern from the slatted floor to the litter area is developed, and when the panel doors 21, 33, 36, 52 and 56 are closed, to prevent access to litter area 15, the hens nonetheless follow essentially the same traffic pattern to the nests. By thus conditioning the hens to the same traffic pattern for both litter areas and nests, a very high percentage of eggs are laid in the nests and the number of floor eggs is markedly reduced. It will be observed that the nests 16, 37 are located generally along the area between the slatted floor portions 12, 12' and 12" and the litter floor portion 15, but it will be appreciated that the exact location of the nests may vary within reasonable limits, so long as the nests are positioned adjacent the juncture of the slatted floor area with the litter floor area. The elevation of nests 16, 37 can vary from above the slatted floor to below the same.

From the foregoing it will be obvious that after the heavy rate of lay is over, the trap panels may be dropped so as to open the spaces 20, 35, 51 and 55 and thereby allow the hens to have egress to the litter covered area 15. When the hens are back in the roosting area, the panels are closed thereby preventing access of the hens to the litter covered area during laying time.

It will of course be appreciated that whereas a number of forms of the invention have been illustrated and described in detail hereinabove, it will be understood that various changes may be made therein without departing from the spirit of the invention or the scope of the following claims. For example, the slatted floors 12, 12' and 12" could instead comprise any known open work floor.

What is claimed is:

1. A poultry house comprising an open work floor and a litter floor, said floors having adjacent ends, at least one nest generally above one of said adjacent ends, and a movable door extending between said nest and one of said adjacent ends.

2. A poultry house as set forth in claim 1, wherein said nest is elevated with respect to said floors, and said door extends between the bottom portion of said nest and one of said adjacent ends.

3. A poultry house as set forth in claim 1, wherein said movable door extends between said nest and one of said adjacent ends at one side of said nest and controls traffic of hens to said litter floor from said open work floor.

4. A poultry house as set forth in claim 1, wherein said movable door comprises part of said open work floor and controls traffic of hens between said open work floor and said litter floor.

5. A poultry house as set forth in claim 1, wherein said nest is positioned substantially over said adjacent ends.

6. A poultry house as set forth in claim 1, wherein said nest is positioned over said litter floor adjacent said adjacent ends in horizontally offset relation to said open work floor.

7. A poultry house comprising an open work floor and a litter floor, said floors having adjacent ends, a series of nests generally above one of said adjacent ends and extending generally along said adjacent ends, and movable door means extending between said series of nests and one of said adjacent ends for selectively preventing access of hens to said litter floor from said open work floor.

8. A poultry house as set forth in claim 7, wherein said movable door means extend between the bottom portion of said series of nests and one of said adjacent ends.

9. A poultry house as set forth in claim 7, wherein said movable door means are positioned beside the nests at opposite ends of said series of nests.

10. A poultry house as set forth in claim 7, wherein said movable door means comprise part of said open work floor.

References Cited in the file of this patent
UNITED STATES PATENTS

| | | |
|---|---|---|
| 506,831 | Ridings | Oct. 17, 1893 |
| 975,733 | Stout | Nov. 15, 1910 |
| 1,212,289 | Van Ackeren | Jan. 16, 1917 |